United States Patent [19]
Engelmann

[11] Patent Number: 5,713,240
[45] Date of Patent: Feb. 3, 1998

[54] METHOD AND APPARATUS FOR AUTOMATIC REMOTE TESTING OF BACKFLOW PREVENTERS

[75] Inventor: Lester B. Engelmann, Woodland, Calif.

[73] Assignee: Ames Company, Inc., Woodland, Calif.

[21] Appl. No.: 672,495

[22] Filed: Jun. 26, 1996

[51] Int. Cl.⁶ ............................................ G01M 19/00
[52] U.S. Cl. ............................................ 73/168
[58] Field of Search ............................................ 73/168

[56] References Cited

U.S. PATENT DOCUMENTS

| | | | |
|---|---|---|---|
| 4,085,287 | 4/1978 | Kullmann et al. | 178/66 R |
| 4,598,579 | 7/1986 | Cummings et al. | 73/37 |
| 4,945,940 | 8/1990 | Stevens | 137/218 |
| 5,046,525 | 9/1991 | Powell | 137/512 |
| 5,085,076 | 2/1992 | Engelmann | 73/197 |
| 5,197,095 | 3/1993 | Bonnett et al. | 379/107 |
| 5,257,208 | 10/1993 | Brown et al. | 364/510 |
| 5,404,905 | 4/1995 | Lauria | 137/557 |
| 5,462,082 | 10/1995 | Lauria | 137/557 |
| 5,531,094 | 7/1996 | More et al. | 73/4 R |

FOREIGN PATENT DOCUMENTS

| | | | |
|---|---|---|---|
| 0150740 | 6/1990 | Japan | 73/168 |

OTHER PUBLICATIONS

Environmental Protection Agency, WH-550, Cross-Connection Control Manual pp. 1-29 and 38-40; Jun. 1989.

AIRTROL Components, Inc., Catalog for AT-1004 Series Prressure Switch and F-4000 Series Adjustable Deadband Pressure Switch, 5 pages; Sep. 1994.

*Primary Examiner*—William A. Cuchlinski, Jr.
*Assistant Examiner*—Willie Morris Worth
*Attorney, Agent, or Firm*—Lothrop & West

[57] ABSTRACT

An apparatus and method for automatic and remote testing of check valves and backflow preventers. Pressure sensors have ports in communication with chambers upstream and downstream from a check valve to be tested. The sensors may be pressure transducers or pressure switches, of single stage, differential, or "dead band" design. Zero or substantially zero liquid flow through the check valve is confirmed either by an existing water flow meter or an auxiliary water flow switch. Upstream and downstream pressures are sampled, and the differential pressure therebetween is compared with predetermined standards and a pass/fail report is rendered. The report may be stored and communicated by hard wire or wireless means, to a remote facility where like information is received from a plurality of check valve sites. One of the three disclosed embodiments teaches an apparatus and method for testing a backflow preventer including a pressure relief valve operating on the reduced pressure principle.

28 Claims, 7 Drawing Sheets

| Fig. 5A |
|---|
| Fig. 5B |

METHOD AND APPARATUS FOR AUTOMATIC REMOTE TESTING OF BACKFLOW PREVENTERS

BACKGROUND OF THE INVENTION

1. Field of the Invention

The invention relates generally to the testing of check valves within backflow preventers, installed in water supply lines. More specifically, the invention pertains to a method and apparatus for unattended remote testing of check valves through the use of: electronic pressure sensors attached to the valves; a test console to receive, analyze, and store data collected from the sensors; and, communication systems between a remote control center and the check valve site, through which tests may be initiated and results may be reported.

2. Description of Prior Art

Backflow preventers generally include an elongated tubular body, having inlet and outlet ports with circular flanges for connection to water supply lines. Internally, a pair of check valves is arranged in serial relation, allowing a unidirectional flow of water through the housing. Backflow preventers are typically installed in water supply lines at the point where the municipal water supply line is connected to an individual user's water system. The purpose of the pair of check valves is to provide redundant protection against contamination of the municipal water supply with impurities introduced from the user's water system.

For example, if the user is a manufacturer of semiconductors, there is a possibility that dangerous solvents may accidentally enter the user's water system. Even if the user is an ordinary household, or apartment building, there is possibility that dangerous, infectious diseases may be introduced into the user's water system, due to malfunctioning drains or toilets. The impurities can enter the municipal water supply from a user's water system by a reverse flow or backflow condition, caused either by backpressure or backsiphonage.

Backpressure occurs when there is a downstream buildup in pressure within the user's system, resulting in a downstream pressure which is greater than the nominal pressure in the supply system. Backsiphonage occurs when there is a catastrophic drop or loss of pressure in the water supply system. Such a drop in pressure may result from a broken main, or a large water draw on a fire line resulting from efforts to extinguish a fire.

Properly functioning check valves prevent backflow through the water supply line by closing in response to an incipient backflow condition. In order for check valves to accomplish this protective function, they must operate in a normal, forward flow condition for long periods of time, then close immediately and seal reliably the moment a backflow condition arises.

However, check valves are not infallible. The friction of water rushing through them during ordinary operation tends to wear away at the valve seals. Water may also include chemicals and minerals, capable of forming deposits on the valve seats and seals. Also, in large water mains, debris such as small sticks and stones may actually lodge within a valve, and prevent closure. Any of these conditions may compromise the integrity of the seal and closing mechanism of the valve, resulting in leaks. Since there is no way of predicting when a backflow situation will arise, the check valves must be kept in proper working condition at all times. This is accomplished by periodically testing the valves and undertaking required maintenance.

Presently, testing of the check valves within a backflow preventer requires that trained personnel visit each site where the backflow preventers are located. The testing personnel must be thoroughly trained regarding the physical peculiarities of each facility, the proper procedure for testing, and the interpretation of test results. Furthermore, testing requires that the backflow preventer be hydraulically isolated from the water supply lines for a period of time. This generally means shutting off the water supply to an entire building or a group of buildings, during the pendency of the test. The testing itself requires paying careful attention to one or more gauges, temporarily connected to different chambers within the backflow preventer. Following a sequence of operations, the gauge readings must properly be interpreted to confirm operational status of the backflow preventer.

Current backflow preventers may also incorporate a special pressure relief valve, operating on the "reduced pressure" principle. The pressure relief valve constantly monitors the pressure differential which exists between an inlet port and an intermediate chamber of the backflow preventer. During normal operation, the pressure in the intermediate zone or chamber, between the two check valves, is at least five pounds per square inch (psi) below the upstream, inlet port pressure. If the upstream check valve has failed, however, the pressure differential will be less than nominal. Under such a condition, the pressure relief valve opens and releases fluid from the intermediate chamber into the surrounding environment. This release of fluid visually serves to notify personnel or building occupants of the check valve failure and the necessity for immediate attention. Currently, testing of such relief valves, operating on the "reduced pressure" principle, also requires onsite presence of personnel and hydraulic isolation of the backflow preventer during the testing procedure.

Examples of efforts to automate the testing of backflow preventers are shown in U.S. Pat. Nos. 5,404,905 and 5,462,082, issued to Lauria. The testing procedures taught in both of these references still require shutting off the inlet water supply with the consequent negative effects on the occupants of the building supplied. Additionally, these procedures do not eliminate the necessity for onsite personnel to conduct the tests.

U.S. Pat. No. 5,275,208 granted to Brown, et al., discloses further improvements in pressure monitoring instruments for backflow preventer testing. The Brown et al. device has two solid-state pressure sensors, respectively attached to the upstream and downstream sides of a check valve. A digital readout, capable of displaying pressures both on the upstream and the downstream sides, as well as the pressure difference between the two, is also disclosed. However, during the course of testing a backflow preventer, this instrument still requires that an outlet gate valve, or its equivalent, be closed to ensure no flow through the backflow preventer from the water supply line.

In summary, two problems still exist in the art of testing check valves used within backflow preventers: (1) the requirement for onsite trained personnel to conduct the tests; and, (2) the necessity of interrupting water flow to the customer during the tests.

The first problem stems from the fact that it is labor intensive and expensive for personnel to go onsite to test each backflow preventer. Moreover, there are many backflow preventers in a given region, requiring that a commensurate number of trained personnel be available for regularly servicing that area. The second problem, interruption of water delivery to a building during business hours, requires advance notice to those using the building, and may significantly disrupt their daily routine. The option exists of visiting sites during the early morning hours, when water use is minimal. However, this option does not obviate the expenses associated with testing personnel, and may also pose difficulties in gaining nighttime access to the part of the building where the backflow preventer is located.

SUMMARY OF THE INVENTION

The present invention represents an improvement over the known art by eliminating the requirement that tried personnel be onsite for testing backflow preventers. The present invention also obviates the necessity of shutting off the water supply line during testing, thereby interrupting daily activities of the water user.

The apparatus and method herein are used in association with a variety of mainline water assemblies, comprised either of discrete or integrated components. These components typically include a strainer, a water flow meter, and a check valve assembly. The check valve assembly may either be a single check valve, or a backflow preventer having two check valves. Other configurations of check valve assemblies may include a by-pass line with a low flow water rate meter, and a pressure relief valve operating on the "reduced pressure" principle.

Currently available water flow meters provide electrical output signals, corresponding to water flow through the meter's impeller. In simple configurations, the meter may only provide real time pulses generated for each rotation of the impeller; more sophisticated meters may store the water usage, and provided regular or on call reports of accumulated usage, as well as instantaneous usage. The electrical output of such meters may be fed through a Meter Interface Unit ("MIU") to a telephone line or an RF transmitter, so the information may be received, stored, and later interpreted at a remote location. This output signal also communicates whether and to what extent, water is currently flowing through the meter.

Although instantaneous water flow information is not generally of interest to the water purveyor, it is of particular importance to one practicing the present invention. In fact, the present invention relies upon the capability of prior art water flow meters, or their equivalents, to confirm substantially zero water flow through the backflow preventer. Significantly, the ability to confirm zero, or substantially zero water flow from a remote location provides unique advantages over prior art backflow preventer testing techniques. If a particular backflow preventer site does not include a water meter, a water flow switch may alternatively be provided as an equivalent structure, to carry out the present invention.

Practice of the invention further requires that electronic pressure sensors be installed in fluid communication with interior portions of the backflow preventer, both upstream and downstream from the check valve(s). A single check valve assembly requires two pressure sensors, whereas a backflow preventer having two check valves, requires three pressure sensors. Alternatively, a pair of differential pressure sensors may be installed across respective check valves, to provide the identical function.

The pressure sensors may be electrical pressure transducers, adapted to provide actual pressure data, in psi or another suitable standard of measure. Alternatively, and equivalently, the pressure sensors may be electrical pressure switches, designed to make or break an electrical circuit according to predetermined pressure calibration standards. Two pressure switches, respectively having high make and low make calibration standards, may also be interconnected hydraulically in parallel and electrically in series, to define a predetermined band or range of acceptable pressures, to perform specialized tests described herein. Alternatively, a single adjustable, differential, "deadband" pressure switch, can perform the identical function as the two separate pressure switches.

Periodically, either by automatic or manual initiation, the rate of flow through the water meter or switch is sampled, seeking a quiescent state for testing to begin. When the rate of flow is actually determined to be zero, or substantially zero, as would likely be the case on weekends or during early morning hours, properly operating check valves in the system under test will close completely. The pressure differential across each check valve is determined, or simply monitored in the case of differential pressure transducers or pressure switches. A predetermined pressure differential between upstream and downstream sides of each check valve should then exist, and be confirmed by the output of the pressure sensors.

Generally, a properly operating, differentially loaded check valve will produce a pressure loss of one to nine psi, from the upstream to the downstream side of the valve. If the check valve has failed to close securely, it will exhibit either no loss, or a pressure loss which is less than the predetermined pressure appropriate for that type of valve. In that event, the testing personnel is alerted that service of the valves within the backflow preventer is required.

Although most municipalities now utilize the procedure outlined above for testing backflow preventers, some areas still utilize a back pressure test. In carrying out this second manner of testing, the technician first isolates the upstream side of the backflow preventer from the supply pressure. Then, using an auxiliary line and an in-line test pressure gauge, manually applies the higher upstream pressure to the downstream side of each check valve. Also, on some occasions, testing using the first described procedure may be attempted when a backpressure condition happens to exist in the water system.

Under the second test procedure, or under a backpressure condition using the first test procedure, a properly operating check valve will maintain a pressure differential of one or more psi from its downstream side to its upstream side. To ensure accurate test conclusions under these circumstances, the apparatus of present invention determines the absolute value of the pressure differential across the valve, and uses that value in determining valve status.

Preferably, for ease of operation, the status of check valves in a plurality of locations will be reported by a communications link or system to a remote, centralized location. Such an arrangement will allow a water purveyor to combine centralized reporting of water usage with remote testing of the condition and status of the check valves located at each site. For convenience and backup, the results of the testing may also automatically be stored at the site of the backflow preventer, and reported to visiting personnel on a visual display located in the vicinity.

A further advantage of the present invention is that it simply and inexpensively, solves the problem referred to in U.S. Pat. No. 4,945,940. The '940 Patent identified as a problem, unauthorized connections to check valve test cocks which bypassed and compromised backflow prevention. The present invention, eliminates, in one preferred embodiment, the test cock fittings which were accessible and adapted for easy interconnection to unauthorized pipes and hoses. With the present invention, anyone attempting to bypass a backflow preventer or to make a diversion connection upstream from a check valve will be thwarted by the lack of proper fittings and an isolating test cock valves.

In lieu of such fittings, the assembly of present invention includes a wire or cable protruding from a specially installed pressure sensor. The present invention solves the unauthorized interconnection problem, while maintaining the capacity to test the check valves, without the expensive and complicated locking mechanism contemplated in the '940 Patent.

In a backflow preventer incorporating a reduced pressure principle relief valve, the present invention similarly eliminates the need for onsite testing personnel and water shutoff to test the relief valve. In accordance with the present teachings, a normally closed solenoid valve, a check valve, and a flow control orifice are provided in a special bypass line, interconnecting the upstream chamber and the intermediate, or zone chamber. These components are used to stage a "fault condition", in which proper operation of the pressure relief valve is tested.

To initiate a testing procedure, the solenoid valve is actuated into an open position, injecting the higher upstream pressure through the check valve into the intermediate chamber. When the sum of the intermediate chamber pressure and the relief valve closing pressure (typically 2 psi) equals the upstream pressure, the pressure relief valve begins to break open, and discharge water. Pressure sensors sample the pressure differential between the upstream chamber and the intermediate chamber, for a predetermined period of time. If the sensors confirm that the pressure differential was maintained between predetermined limits, then the pressure relief valve passes the test. If, however, the pressure differential falls outside these limits, either the valve is defective or the solenoid is defective, and a component failure condition is reported.

Next, the process is reversed by deactivating the solenoid valve, and closing off the bypass line. Water continues to discharge from the pressure relief valve until pressure equilibrium is reached between the upstream chamber and the intermediate chamber assisted by the closing pressure of the relief valve spring. At the moment of equilibrium, the relief valve should again close. Inability of the sensors to confirm an appropriate pressure differential between the two chambers indicates either that the relief valve, or the solenoid valve, is stuck open. In this event, a component failure is also reported, so that corrective measures can be undertaken.

DETAILED DESCRIPTION OF THE PREFERRED EMBODIMENT

Figure 1:
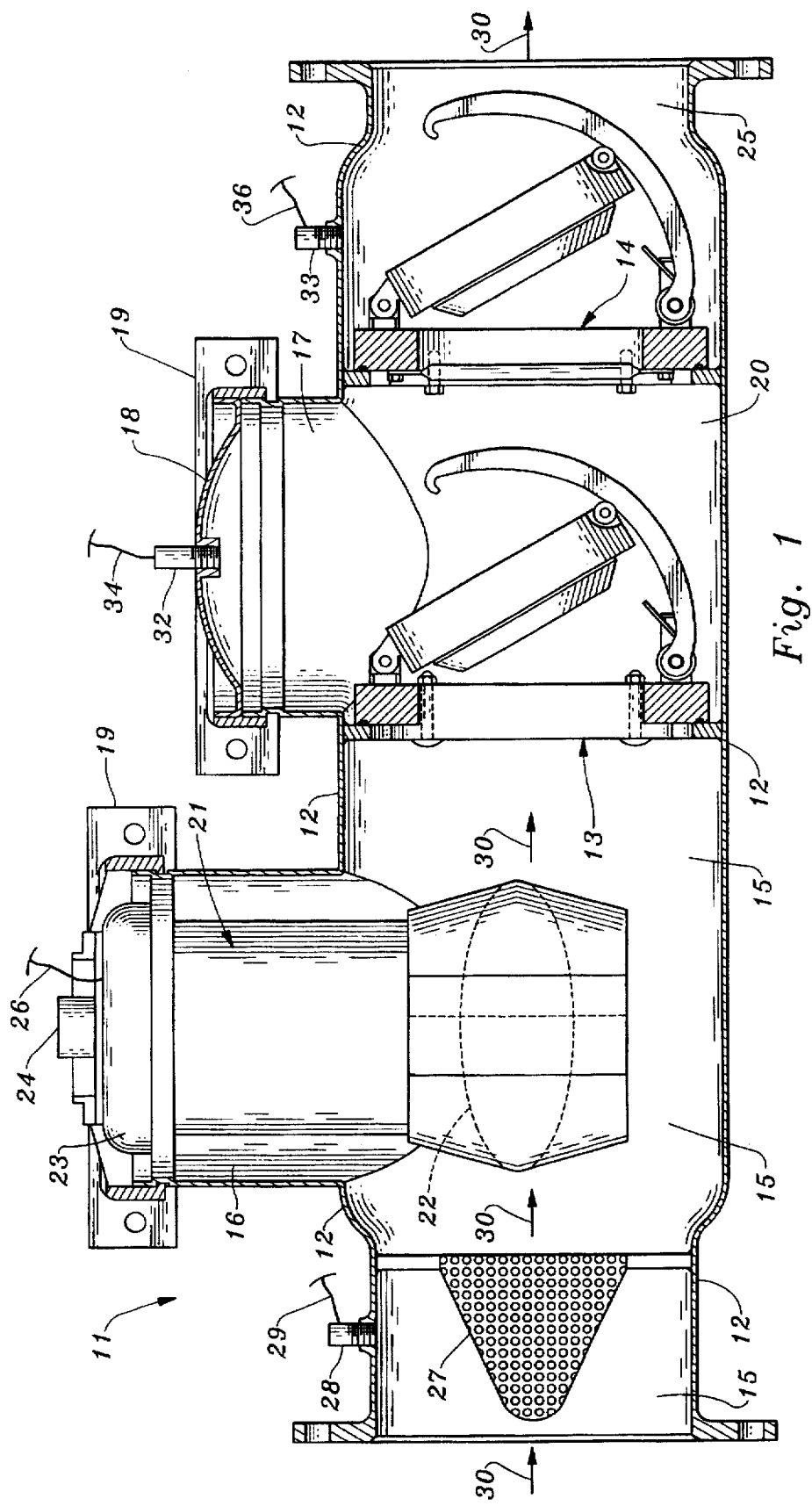
FIG. 1 is a median, longitudinal, cross-sectional view of an integrated water strainer/meter and backflow preventer, showing the main check valves in respectively open positions and three pressure transducers installed in various portions of the housing sidewall.

Turning now to the drawings, FIG. 1 shows an integrated water meter and backflow preventer assembly, generally designated by the numeral 11. Recently, the art has seen innovation in structurally and functionally integrating both check valves and backflow preventers with water meters and strainers. It should be noted that assembly 11, used in describing the features and operation of the present invention in testing such devices, incorporates some of these innovations.

In U.S. Pat. No. 5,085,076 issued to Engelmann, the applicant herein, an integrated assembly, including a fluid flow meter, a check valve, and a water strainer, is disclosed and claimed. The disclosure and subject matter of U.S. Pat. No. 5,085,076 are hereby incorporated by reference into the present application. A further advancement in the integration of components used in water supply lines was disclosed and claimed by Engelmann in U.S. application Ser. No. 08/511,083, filed Aug. 3, 1995. This application discloses a combined water strainer, flow meter, and double check valve backflow preventer. The disclosure and subject matter of application Ser. No. 08/511,083 are hereby incorporated by reference into the present application, as well.

Assembly 11 includes an elongated tubular housing 12, which may either be welded from individual pieces of stainless steel, or the like, or alternatively, cast as an integrated structure. Housing 12 includes an upstream chamber 15, an intermediate, or zone chamber 20, and a downstream chamber 25, together defining a collinear liquid flow path therethrough, indicated by numeral 30. A first, upstream check valve 13 defines the separation between the upstream chamber 15 and the intermediate chamber 20. A second, downstream check valve 14 separates the intermediate chamber 20 from the downstream chamber 25.

The sidewall of housing 12 also includes a first, upstream service port 16 and a second, downstream service port 17. Service port 17 is hydraulically sealed by a selectively detachable bonnet, or domed cap 18. The bonnet 18 is compressively secured in place by a pair of split rings 19, or a circular bolt-attached ring (not shown), in conjunction with customary sealing gaskets. A conventional turbine meter 21 is detachably secured within the first service port 16, also by means of a pair of split rings 19. By selective removal of rings 19, an upper end of meter 21 may be grasped to facilitate removal of the meter and giving access to other internal components for servicing.

The turbine meter 21 includes a rotary turbine impeller 22, and a register 23 including a visual display 24. Through various gears and mechanical or magnetic drive mechanisms (not shown), the rotary motion of turbine 22 either advances a mechanical mechanism or triggers electrical circuitry in register 23, in accordance with the total volume of water passing through path 30. A visual indication of the total water flow is also provided by display 24.

Register 23 includes an output line 26, so that an electrical output signal, usually in the form of pulses, is produced in response to any advancement of the register as a result of water flowing through housing 12. Mechanical, magnetic, optical, or other equivalent structures may be used functionally to correlate advancement of impeller 22 and register 23, with the production of electrical output pulses.

Alternatively, in lieu of meter 21, a conventional water flow switch (not shown) may be employed. A water flow switch would be entirely independent in structure and operation from meter 21, and may be located either within housing 12, or elsewhere, such as incoming, outgoing, or low flow rate by-pass lines. Such a switch would typically include an impeller or other element which rotates in response to water flow, and accordingly produces an electrical pulse, or completes an electrical circuit.

A debris strainer 27 may be installed across the inlet of upstream chamber 15 to protect the turbine impeller 22 from damage caused by stones, sticks, and calcified deposits passing through the water line. It should be noted that a proportional-type water flow meter (not shown) may be used in lieu of the turbine meter. A proportional-type water flow meter, which only uses a small bypass line for measuring water flow, does not require a strainer 27.

An upstream pressure transducer 28 is threadably secured within a female fitting in the sidewall of housing 12. Transducer 28 is in communication with upstream chamber 15, and provides an electrical output signal which is proportional to the pressure within that chamber. A line 29 carries the output signal from transducer 28 to a test console 31. Similarly, an intermediate pressure transducer 32 and a downstream pressure transducer 33, are secured within respective female fittings in housing 12. Transducers 32 and 33, respectively provide electrical output signals through lines 34 and 36, which are proportional to the pressures within intermediate chamber 20 and downstream chamber 25. Lines 34 and 36, along with line 26 from register 23, also lead to test console 31.

Figure 3:
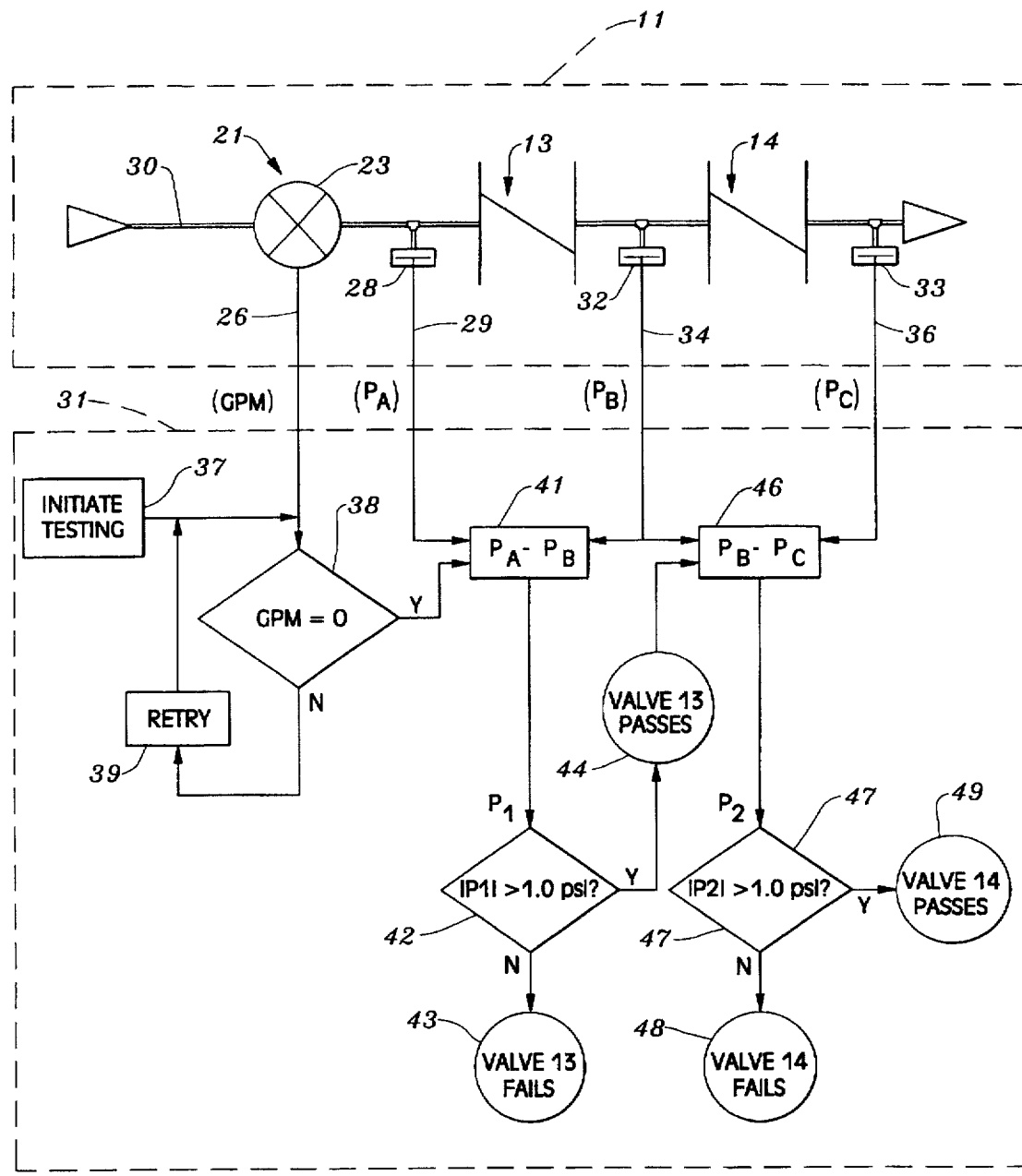
FIG. 3 is a diagrammatic representation of a meter, check valves, and three pressure transducers, combined with a corresponding flow chart showing the sequence and decision making process for testing the check valves.

Over these various lines, test console 31 receives output signals from register 23, transducer 28, transducer 32, and transducer 33 (see, FIG. 3). It should be noted that a single telephone line, or other hardwire lines, may be used to carry the output signals to the test console 31, either in an adjacent or a remote location from backflow preventer 11. In the event that a telephone line already exists for conveying an output signal from a water flow meter, this single line could be employed to carry the transducer signals through multiplexing techniques, well known to those of ordinary skill in the art. Or, the telephone line could be used only to carry a signal for initiating a test procedure, in which case the console would later report only the results back to a centralized location. Other apparent means to convey the control, output, and report signals associated with console 31 would include radio frequency transmission and fiber optic line transmission.

Console 31 includes a conventional A/D converter (not shown) for converting the analog signals from the pressure transducers into digital signals. Console 31 also includes other signal processing and logic circuitry, in furtherance of the check valve testing procedures contemplated herein. Making specific reference now to FIG. 3, it will be noted that the operations performed by these components within console 31 are shown by means of a flow chart. As will be explained below, this flow chart includes certain sequential decision making steps and determinations which are essential for successful practice of the present invention.

The upper portion of FIG. 3 shows a diagrammatic representation of a backflow preventer 11, including a water meter 21 and a pair of check valves 13 and 14. Water flow through the backflow preventer is measured by the meter 21. A register 23 reports flow in gallons per minute (GPM) over output line 26 to the console 31. The upstream pressure transducer 28 is in communication with chamber 15, upstream from the first check valve 13. An electrical output signal proportional to the upstream pressure ("PA") detected by transducer 28, is delivered over line 29 to console 31. The pressure transducer 32 reports the intermediate pressure ("PB") which exists within chamber 20, between check valves 13 and 14. This electrical signal is carried over line 34, to console 31. Lastly, the console 31 receives downstream pressure ("PC") reports from transducer 33, by means of output line 36.

The lower portion of FIG. 3 depicts a flowchart illustrating the method of sampling and analysis implemented by the test console 31. Testing procedures are undertaken periodically, at a rate consistent with current governmental requirements for maintaining proper operation of the check valves. Typically, testing will be undertaken at least every year, although more frequent testing may be appropriate for critical applications. The test console 31 may contain or be interconnected to a programmable clock for automatically undertaking the testing at predetermined intervals. Or, if the test console 31 is remotely positioned or remotely controlled from centralized location, personnel at the centralized location may manually initiate the testing.

On the initiation (step 37) of a testing procedure, the test console 31 samples (step 38) the flow rate (GPM) readout from register 23. This may be done either by reading the instantaneous flow rate outputted by the register 23, or by monitoring any pulses generated by rotation of the turbine impeller 22, during a period slightly greater than the time frame that would equal the minimum recordable flow rate of the meter 21.

Because a normal water flow through the backflow preventer would skew pressure readings and invalidate the test results, substantial absence of flow must be confirmed before testing can proceed. It is known that some currently available meters cannot measure any liquid flow whatsoever, below approximately four ounces per minute. However, it is not believed that such a minimal flow, even if undetected, would interfere with the testing contemplated herein. Therefore, for purposes of the present explanation, it can be assumed that either zero flow, or substantially zero flow through the backflow preventer, will enable accurate testing of the components of the preventer.

Continuing with the test procedure, as long as the flow rate is determined not to be zero, or not below a threshold flow rate, a clock in console 31 repeatedly delays and then retries (step 39) another sampling of the flow rate. When the flow rate is confirmed as zero, or does not exceed the threshold flow rate above which readings would be unacceptably skewed, the test console 31 commences testing of the check valves 13 and 14.

It should be noted that with a zero flow rate through assembly 11, valves 13 and 14 will be in a closed position, not the open position shown in FIG. 1, associated with a normal flow condition. FIG. 1 shows the valves in their fully open position for illustrative purposes, so the relative positions of the valve clappers can be compared to the closed valve clappers shown in FIG. 2.

The first upstream check valve 13 is tested by determining the pressure differential which exists between upstream chamber 15 and intermediate chamber 20, and then comparing that differential with a predetermined standard. The predetermined standard represents the static pressure loss exhibited by a properly functioning check valve. This initial determination is accomplished by first subtracting (step 41) PB from PA, giving a resultant value P1. Under normal conditions, P1 will be a positive value. However, under a backpressure condition, this subtraction step may result in a negative value. Therefore, for the next step, only the absolute value of P1 is considered.

If the absolute value of P1 is determined (step 42) to be less than the predetermined value, then first check valve 13 is reported (step 43) as failed by test console 31. In a typical backflow preventer which is not equipped with a relief valve operating on the reduced pressure principle, the predetermined value for both check valves is about one psi. If the absolute value of P1 is determined (step 42) to be greater than the predetermined value, then valve 13 is reported (step 44) as passed, and the test continues.

Similarly, the second check valve 14 is tested by first determining the pressure differential which exists between intermediate, or zone chamber 20 and downstream chamber 25. Then, that existing pressure differential is compared to a predetermined standard, and a pass/fail determination is made. Thus, PC is subtracted (step 46) from PB, resulting in value P2. Then, taking the absolute value of P2, a determination (step 47) is made, comparing P2 and a predetermined standard value. As with the first check valve, this predetermined standard is typically one psi. If the absolute value of P2 is less than the predetermined standard, the second check valve 14 is reported (step 48) as failed by the test console 31. However, if the absolute value of P2 is determined (step 47) to be greater than the predetermined value, then valve 14 is reported (step 49) as passed.

As discussed above, the test console 31 may then store the pass/fail determinations for both check valves, and report those findings to a centralized location. The reporting may be conducted over the same phone lines used remotely to report the metered usage, as described in U.S. Pat. No. 5,197,095, or in U.S. Pat. No. 4,085,287. Alternatively, the test console 31 may simply store the data in electronic or magnetic storage media (not shown), and on demand provide a visual readout or a printed report, which may be reviewed or retrieved at the convenience of personnel.

Figure 4:
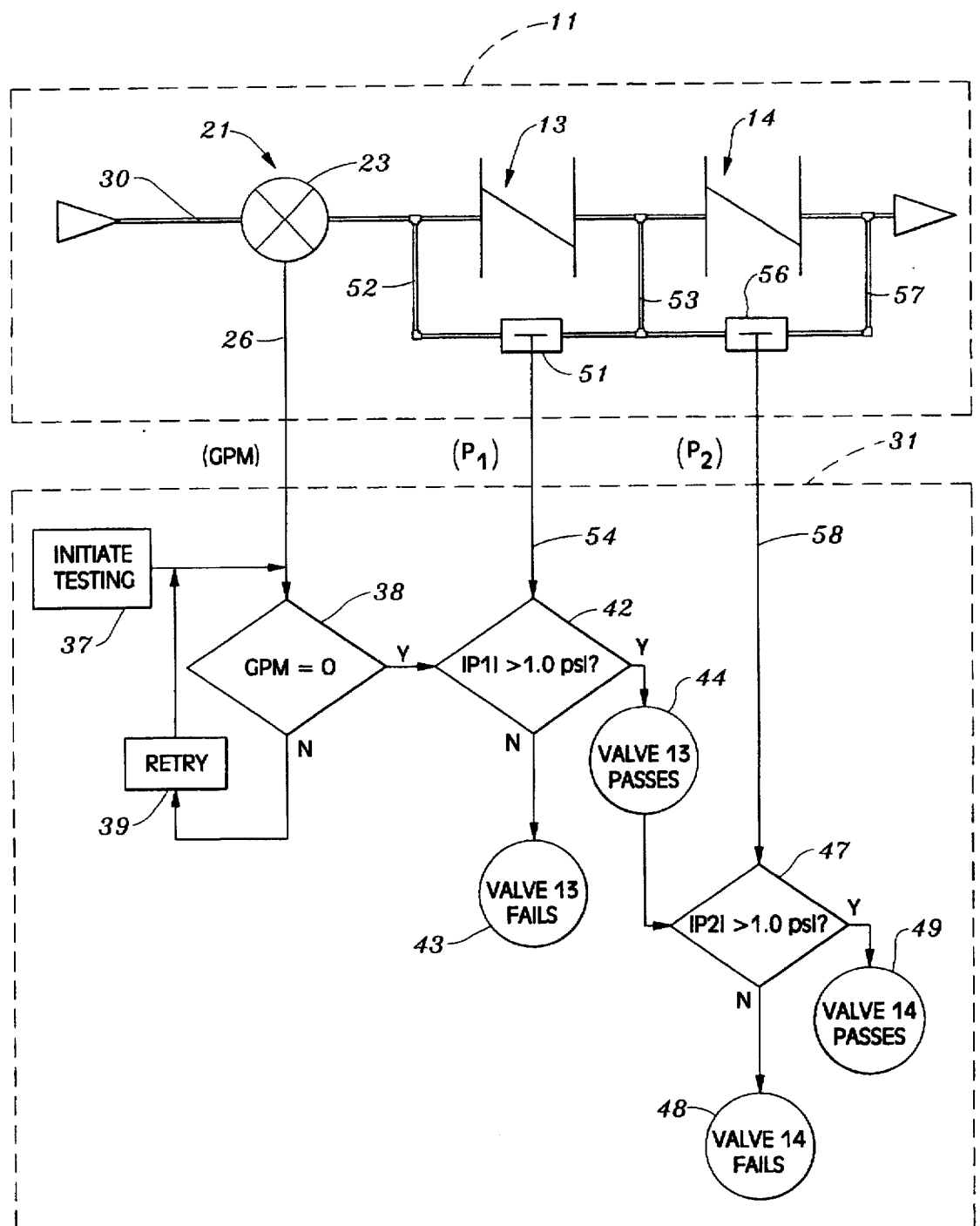
FIG. 4 is a diagrammatic representation of a meter, check valves, and two absolute differential pressure transducers, combined with a corresponding flow chart showing an alternative sequence and decision making process for testing the check valves.

The upper portion of FIG. 4 shows a diagrammatic representation of a combined meter and backflow preventer 11, fitted with absolute, differential pressure transducers. Since this backflow preventer is identical in configuration to the apparatus shown in FIG. 1, no duplicate drawing of that apparatus is necessary to explain this alternative embodiment. Essentially, this alternative embodiment replaces the three pressure transducers used in the first embodiment, with two absolute differential pressure transducers. One benefit provided by this alternative embodiment is that certain mathematical steps need not be performed by the test console, as the test result data is provided directly by the differential pressure transducers.

In the lower portion of FIG. 4, a flowchart illustrating an alternative method of sampling and analysis implemented by the test console 31 is shown. Except as noted below, the alternative apparatus and method of FIG. 4 is identical to that shown in FIG. 3, described above in detail. Therefore, for brevity, only those differences which exist between the two embodiments will be identified.

A first, upstream absolute differential pressure transducer 51 is installed across check valve 13, by means of an upstream line 52 and an intermediate line 53. Upstream line 52 is in communication with upstream chamber 15, and intermediate line 53 is in communication with intermediate, or zone chamber 20. By virtue of its dual input, differential design, and absolute pressure determination capabilities, transducer 51 produces an electrical signal through output line 54, which represents the absolute value of the difference, if any, between pressures which exist in chambers 15 and 20. This absolute differential pressure is represented by P1, as in the FIG. 3 embodiment.

A second differential pressure transducer 56 is installed across the second check valve 14 so that one side of the transducer 56 is in communication with the pressure in the intermediate chamber 20 and the other side is in communication with the pressure in the downstream chamber 25. This is accomplished with intermediate line 53 and a downstream line 57, each sampling pressures within respective chambers and then feeding those pressures to the dual inputs of transducer 56.

In identical fashion as with transducer 51, downstream transducer 56 produces an electrical signal through an output line 58 which corresponds to the absolute difference, if any, between pressures existing in chambers 20 and 25. This absolute differential pressure is represented by P2, as in the FIG. 3 embodiment.

Use of the absolute differential pressure transducers 51 and 56 eliminates the need for circuitry within the test console to determine the difference between the chamber pressures, and to assign an absolute value to that differential pressure. In other words, subtraction steps 41 and 46 and the absolute value assessment portion of step 42 of FIG. 3 are not necessary to practice this embodiment. Rather, the differential pressure transducers 51 and 56 directly produce absolute pressure difference values P1 and P2. Then, these values are used in making the pass/fail determinations for the check valves, as otherwise described in FIG. 3.

Further to simplify the apparatus, differential pressure switches or absolute differential switches may be substituted for the differential pressure transducers described above. Such differential pressure switches, in sampling the pressures across each check valve, provide a "make" contact and complete an electrical circuit, providing a minimum differential set pressure exists across the respective sampled valves.

To ensure accurate results for check valve testing during backpressure conditions, a second differential pressure switch is installed across each check valve. It is significant to note that this second set of switches has its test ports reversed. This is done so that in backpressure condition exists, the second differential pressure switch will conduct an electrical circuit, indicating that the check valve is properly maintaining a seal against the backpressure condition. In other words, a check valve is also considered functional if it is capable of maintaining a reverse pressure caused by a backpressure condition. To that end, the first and second differential pressure switches are parallel wired to the sampling input of the console 31, so that if either switch provides a conductive circuit, the logic circuitry will indicate a "pass" for the valve under test. Alternatively, a single absolute differential pressure switch would eliminate the necessity of pairing differential pressure switches, for proper testing of check valves under a backpressure condition.

Whereas pressure transducers require logic circuitry to determine the extent of pressure differential, and then compare that value to predetermined standards, a properly calibrated pressure switch inherently and forthwith makes those pressure differential determinations and comparisons. It is evident that pressure switches employed in the present invention provide the simplest and most straightforward means to test the valves for proper operation. On the other hand, pressure transducers and the appropriate logic circuitry will provide data corresponding to the actual pressures measured within each chamber and determined across each check valve. This additional data, while requiring more sophisticated hardware to collect, analyze, and communicate, provides more specific information about the backflow preventer components and the associated water system pressures. Thus, depending upon the backflow preventer site and amount of information required, the pressure sensors employed may either be pressure switches or pressure transducers.

Figure 2:
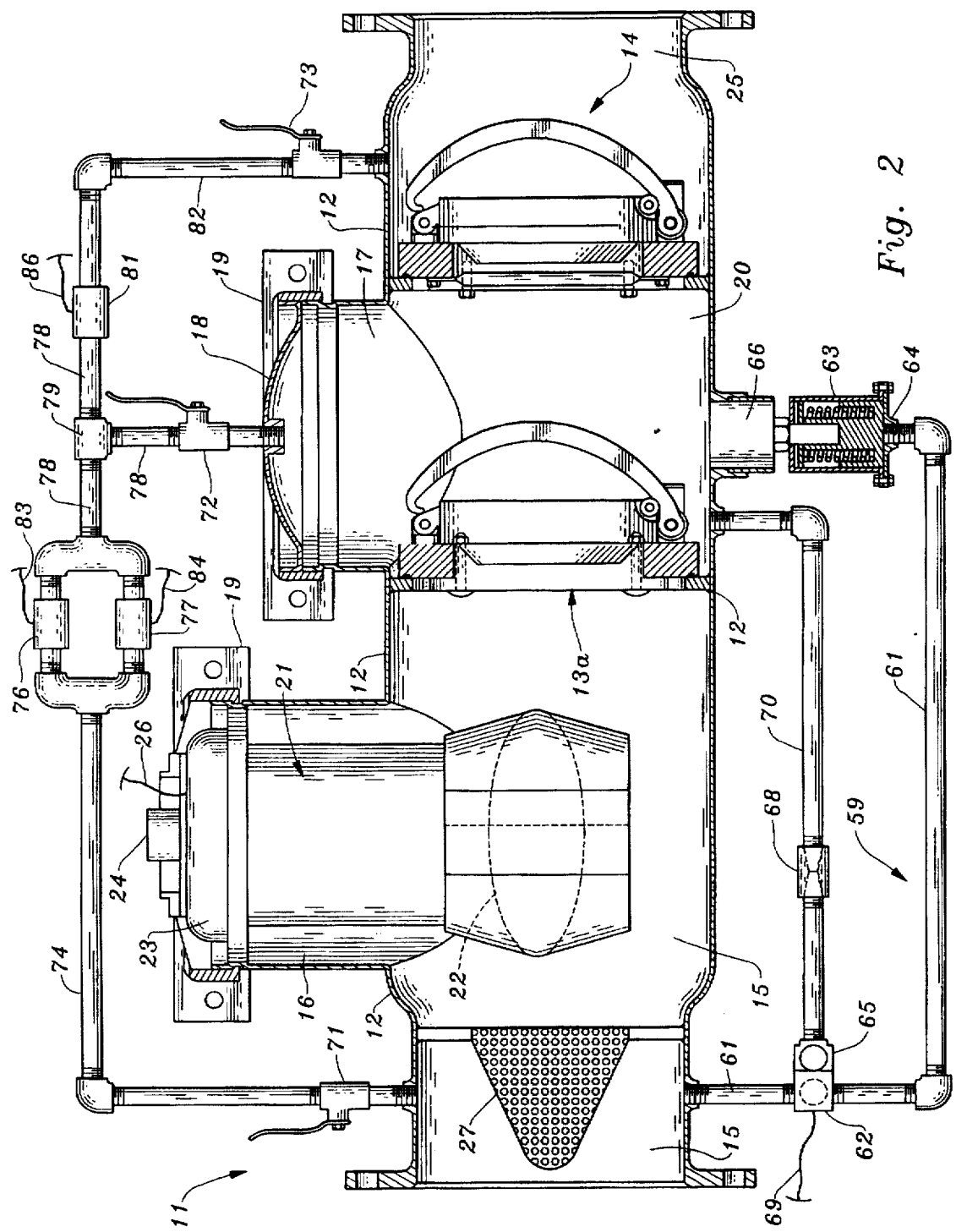
FIG. 2 is an alternative embodiment of the invention, showing a median, longitudinal, cross-sectional view of an integrated water strainer/meter and backflow preventer with the main check valves in a closed position, and further incorporating a pressure relief valve with a sampling line, and a by-pass testing line.

Turning now to yet another embodiment of the invention, FIG. 2 shows a combined meter and backflow preventer 11 incorporating a pressure relief valve assembly 59. The assembly 59 incorporates a conventional pressure relief valve 63, operating on the "reduced pressure" principle, well known to those of ordinary skill in the art. Such a valve is shown and described in U.S. Pat. No. 5,046,525, issued to Powell. Pressure relief valve assembly 59 includes an inlet line 61, placing upstream chamber 15 in communication with a first inlet 64 of valve 63. The assembly 59 also includes a second inlet 66, interconnecting the other end of valve 63 with intermediate chamber 20.

A two-way solenoid valve 62 is provided within line 61. Solenoid valve 62 normally interconnects the first inlet 64 of relief valve 63 with upstream chamber 15, so that upstream pressure is imposed upon valve 63 at all times. However, during a test procedure to be described below the solenoid valve 62 is actuated into a second, open position. In this open position, valve 62 additionally directs fluid from line 61 first through a downstream directed check valve 65, and then through a by-pass test line 70. The downstream end of test line 70 is in communication with intermediate chamber 20. A flow control orifice 68 is included within line 70, between the check valve 65 and the intermediate chamber 20. For the purpose of actuating solenoid 62, a control line 69, leading to test console 31, is provided.

Relief valve 63 is designed to remain closed, as long as a predetermined pressure differential exists between upstream chamber 15 and intermediate chamber 20. This is accomplished by providing an upstream check valve 13a with stronger than normal springs, or other means, biasing the valve clapper into a closed position. As a result, instead of the 1 psi loss experienced through a standard check valve, at least a 5 psi head, or pressure loss is effected by the upstream check valve 13a used in this special application.

Under a fault condition which is automatically simulated by the present invention, the pressure in intermediate chamber 20 falls within a predetermined range, so that the pressure differential between chamber 20 and chamber 15 is fewer than 5 psi and greater than 2 psi. In other words, if the upstream pressure is, for example, 100 psi, then the fault condition pressure within the intermediate chamber is between 95 psi and 98 psi. In that event, pressure relief valve 63 should open, allowing liquid to escape as long as that fault condition exists.

The apparatus shown in FIG. 2 also includes test cocks 71, 72, and 73, threadably attached through respective pipe nipples to housing 12. An inlet sampling line 74 extends from cock 71 respectively to the first ports of a 2 psi differential pressure switch 76 and a 5 psi differential pressure switch 77. An intermediate sampling line 78, including a "T" fitting 79, extends respectively from the second ports of switch 76 and switch 77 to cock 72. Another leg of line 78 extends to a first port of a 1 psi absolute differential pressure switch 81. An outlet sampling line 82 extends from a second port of switch 81 to cock 73.

During normal operation, all three test cocks are left open to permit communication between the chambers 15, 20 and 25 and the variously interconnected pressure switches. During onsite maintenance, the test cocks may be closed to permit replacement and calibration of the pressure switches. Alternatively, unauthorized connections to the backflow preventer may be further discouraged by eliminating the test cocks and simply attaching the pressure switches directly to the respective chambers, as shown in FIG. 1.

Figures 5, 5A:
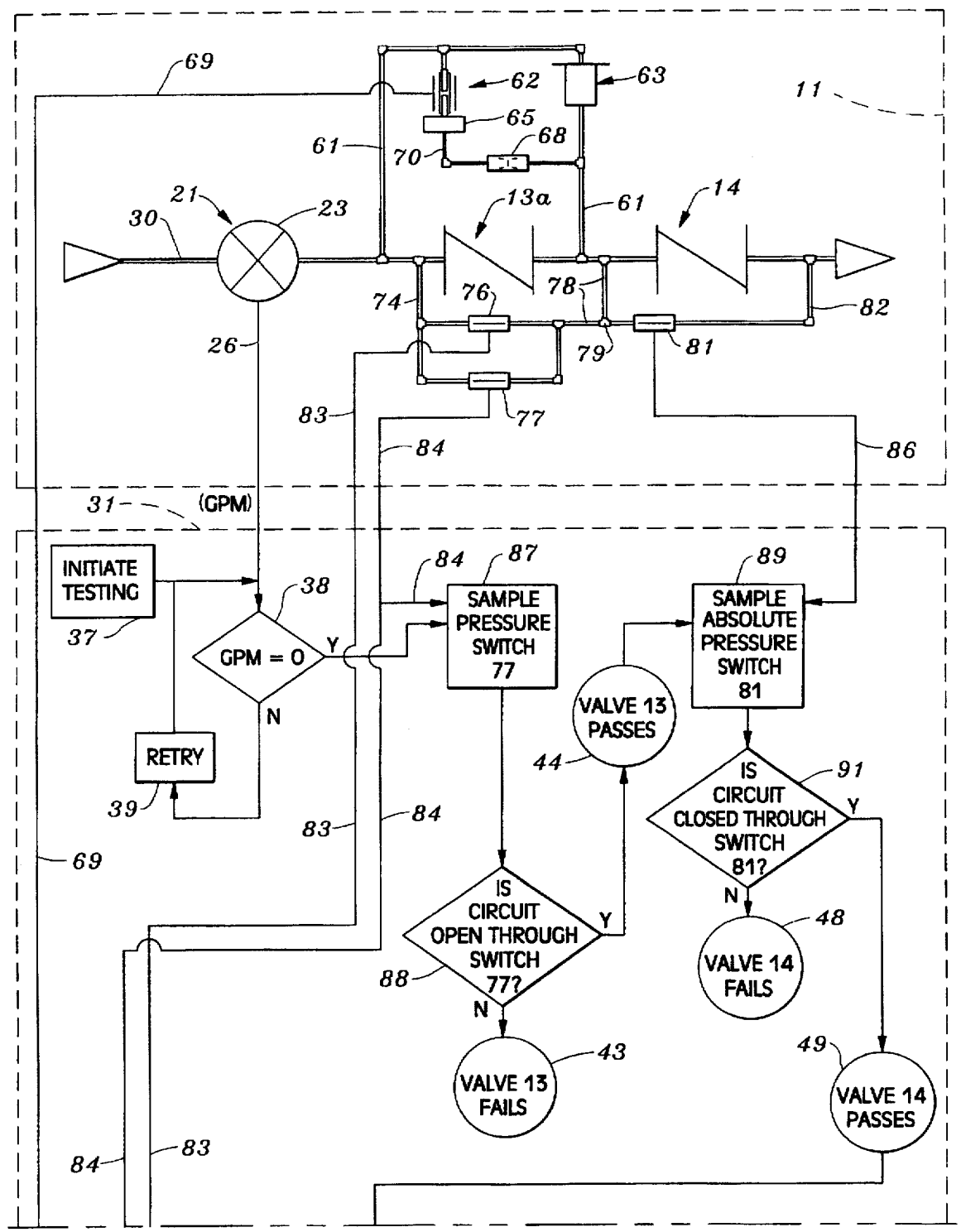
FIG. 5 is a diagrammatic representation of a meter, check valves, pressure relief valve, solenoid valve, and absolute pressure transducers, combined with a corresponding flow chart showing the sequence and decision making process for testing the check valves and the pressure relief valve.
Figure 5B:
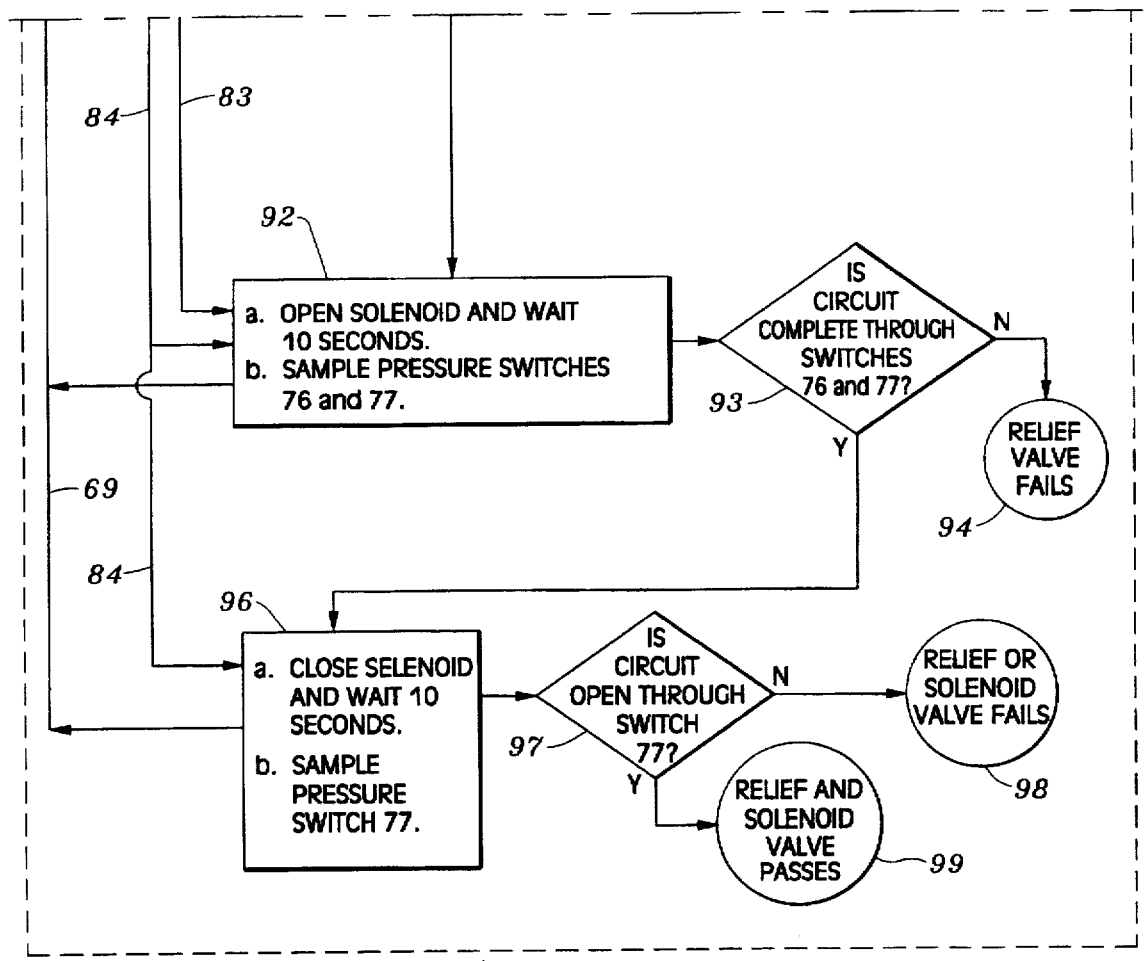

All of the pressure switches used herein have internal electrical contacts, but each is specially constructed and calibrated to make or break its contacts in response to different pressure conditions. Pressure switch 76 is configured so that its internal contacts make, or complete a circuit, whenever the pressure differential between upstream chamber 15 and intermediate chamber 20, exceeds 2 psi. Switch 76 has a two lead output conductor 83, as shown in FIGS. 2 and 5. Pressure switch 77 is adapted so that its internal contacts complete a circuit as long as the pressure differential between upstream chamber 15 and intermediate chamber 20 does not exceed 5 psi. Switch 77 includes a two lead output conductor 84, interconnected to its internal contacts. Lastly, absolute differential pressure switch 81 completes a circuit whenever the absolute pressure differential between intermediate chamber 20 and downstream chamber 25 exceeds 1 psi. Switch 81 also includes a two lead output conductor 86, leading to console 31.

FIG. 5 is similar in many respects to FIG. 3, both in terms of the components shown, and in the operation of those components. Therefore, the following discussion will primarily address those new or different features, which are not included in FIG. 3. Clearly, the most apparent new aspects of the alternative embodiment shown in FIG. 2, are the pressure relief valve 63, the by-pass test line 70, and the associated pressure switches described above. As with check valves, pressure relief valves fail for a variety of reasons, resulting either in leaks or inability to indicate a fault condition. Accordingly, this embodiment of present invention includes an apparatus and a method, for testing a pressure relief valve used in conjunction with a backflow preventer.

The lower portion of FIG. 5 shows control console 31, including a flowchart illustrating the method of testing the apparatus shown in FIG. 2. As in the testing method described within FIG. 3, the test console 31 initiates (step 37) a test procedure by sampling the flow rate (GPM) through the preventer 11. Once it has been confirmed (step 38) that the flow rate is zero, or substantially zero, the console 31 commences testing of the check valves, followed by testing of the pressure relief valve 63.

Because this embodiment uses pressure switches rather than pressure transducers to monitor pressures within the preventer 11, a somewhat different method is employed to perform the various test. For example, check valve 13a is tested by sampling (step 87) pressure switch 77. A determination (step 88) is made whether the switch contacts within switch 77 are open or closed. If the circuit is closed through switch 77, it means that the pressure differential across valve 13a does not exceed 5 psi, and it is reported (step 43) that valve 13a has failed the test. However, if the circuit is open through switch 77, it is reported (step 44) that valve 13a has passed the test.

It is evident that a different predetermined standard is applied in testing the condition of upstream check valve 13a, used in this embodiment of the invention. In other words, the pressure loss, or drop across valve 13a must exceed 5 psi, to accommodate the special differential operating pressures, required for reliable operation of pressure relief valve 63.

Check valve 14, on the other hand, is tested using the same predetermined differential standard (1 psi), as used in testing the first embodiment. After sampling (step 89) absolute pressure switch 81, a determination (step 91) is made whether the contacts within switch 81 are closed or not. As has been discussed above, the contacts of switch 81 will close when the absolute pressure differential between intermediate chamber 20 and downstream chamber 25 exceeds 1 psi. Switch 81 must respond to the absolute pressure differential to ensure accurate reports during a backpressure condition, when the downstream chamber pressure exceeds intermediate chamber pressure. In this instance, a properly operating check valve 14 will be closed, maintaining the "reverse" pressure differential detected by switch 81. If the switch 81 does not exhibit a closed circuit, then valve 14 is reported (step 48) as failed. However, if the circuit is detected as closed, then valve 14 is reported (step 49) as passing the test.

After confirming that both check valves have passed their respective tests, testing of the pressure relief valve 63 is initiated (step 92). First, in carrying out step 92a, an electrical signal is routed to control line 69, energizing solenoid 62. As previously discussed, energizing solenoid 62 allows fluid under pressure from line 61 to pass through check valve 65, by-pass test line 70, flow limiting orifice 68, and into intermediate chamber 20. This controlled, predetermined reduction in the pressure differential between chambers 15 and 20 will cause pressure relief valve 63 to open and remain open as long as the staged fault condition exists. This method of by-passing check valve 13a closely simulates the current manual testing technique used by service technicians; however, the present invention accomplishes this test automatically and remotely, without the involvement of service technicians.

After an approximate delay of ten seconds, which allows the hydraulic flow through the relief valve to stabilize, pressure switches 76 and 77 are sampled (step 92a). A determination (step 93) is made, whether both switches exhibit a complete circuit. If not, the relief valve is reported (step 94) as failed. Typically, this will mean that the relief valve has not opened, and the greater than 5 psi differential established by the check valve 13a continues, keeping pressure switch 77 open. If, however, the contacts of both switches 76 and 77 show a complete circuit, it is concluded that the pressure relief valve has opened properly, and has passed the test.

Continuing the test procedure, the test console initiates (step 96) a relief valve closing sequence. First, step 96a terminates the actuation signal to solenoid valve 62, closing valve 62 and isolating by-pass line 70 from the upstream chamber pressure. After a predetermined time, for example, ten seconds, the pressure switch 77 is sampled (step 96b). A determination (step 97) is made whether the circuit through switch 77 is open or closed. If it is closed, either the relief valve 63, or the solenoid valve 62, has failed to close properly and they are reported (step 98) as failed by the test console. If the pressure differential between the upstream and intermediate chambers returns to the expected pressure (in excess of 5 psi), the circuit through switch 77 will be open. This confirms that both the valve 63 and the solenoid 62 have returned to their normal closed positions, and both components are reported (step 99) as passed.

Figure 6:
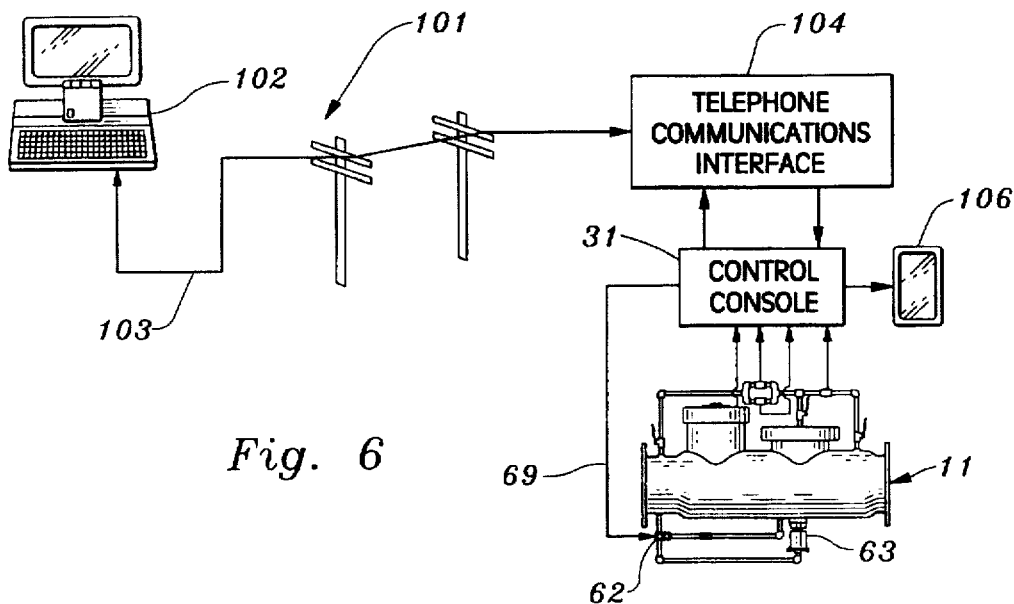
FIG. 6 is a diagrammatic representation of a remote, centralized station telephonically linked to a backflow preventer site.
Figure 7:
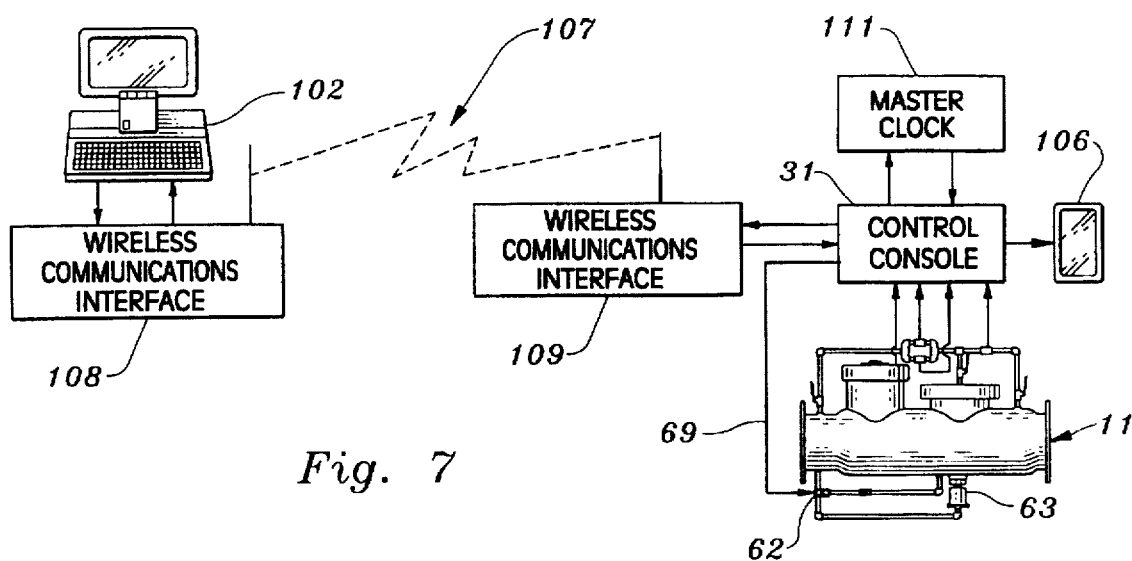
FIG. 7 is a diagrammatic representation of a remote, centralized station linked by a wireless system to a backflow preventer site, including a master clock for programmable, timed initiation of test sequences.

As discussed above, test result data may be stored on site, automatically transmitted to a remote, centralized location, accessed from a remote location on demand, or simply displayed for personnel at the backflow preventer site. Exemplary systems for effecting these functions are depicted in FIGS. 6 and 7. In FIG. 6, a telecommunications system 101 includes a computer 102 having an internal modem, a telephone line 103, and a telephone communications interface 104. Computer 102 would typically be located within a central business office, having a telephone system capable of receiving incoming data from plural backflow preventer sites.

Communications interface 104 includes a modem, and is interconnected both to the telephone line 103 and the control console 31. A visual display 106 may be provided to show both current and historical data such as backflow preventer status, sensor output, test sequence stage, and test results. The control console may include a microprocessor with data storage capabilities to facilitate the retention and output of such data on display 106. The control console is also variously interconnected to the pressure sensors, the water meter register, and the solenoid of backflow preventer 11, as discussed above.

A test procedure may be initiated by a command from computer 102, or a by means of a programmed clock in the control console's microprocessor. Providing the water flow is confirmed as zero, or substantially zero, the test sequence will automatically be undertaken, and the results reported and stored, either for current review or later retrieval. Personnel may review the test results either on site, by viewing the display 106, or by examining the video monitor/ display of computer 102. Depending upon how the control console is configured, the test results may simply be stored on site, or stored on site and automatically sent over the telecommunications system to the central office.

A typical wireless communications system 107 is illustrated in FIG. 7. Computer 102 is interconnected to a first wireless communications interface 108, preferably including a transmitter, a receiver, and an antenna. The computer 102 and the interface 108 may be either at a fixed, remote location, or within a motor vehicle. At the backflow preventer site, a second wireless communications interface 109 is provided, having identical communication capabilities. A programmable master clock 111 is interconnected to the control console 31. A backflow preventer 11, including a pressure relief valve 63, has various electronic circuits connected to the control console, for data sampling and component control operations.

Master clock 111 is programmed automatically to initiate a test sequence in accordance with a predetermined schedule. By simply issuing a new command from computer 102, clock 111 can be reconfigured to undertake tests at any desired interval. As with the system described in FIG. 6, test results may be stored, displayed, and retrieved, either at the backflow preventer site or at the remotely located, central business office or roving motor vehicle.

It will be appreciated, then, that I have disclosed herein an improved apparatus and method, for automatic remote testing of backflow preventers.

What is claimed is:

1. An apparatus for testing a check valve transversely positioned within a housing, the valve defining an upstream chamber and a downstream chamber therein, said apparatus comprising:
   a) a flow detector, producing a test initiation signal when at least substantial absence of liquid flowing through the housing is confirmed;
   b) a first pressure switch in communication with the upstream chamber, said first pressure switch producing a first electrical output signal;
   c) a second pressure switch in communication with the downstream chamber, said second pressure switch producing a second electrical output signal;
   d) means responsive to said test initiation signal, for sampling said first and second electrical output signals, and producing a pass/fail report dependent upon a comparison of said signals with a predetermined standard.

2. An apparatus for testing a check valve transversely positioned within a housing, the valve defining an upstream chamber and a downstream chamber therein, said apparatus comprising:
   a) a flow detector, producing a test initiation signal when at least substantial absence of liquid flowing through the housing is confirmed;
   b) a differential pressure switch having a first port in communication with the upstream chamber, and a second port in communication with the downstream chamber, said switch having electrical contacts and producing an electrical output signal when a predetermined pressure differential exists between said chambers;
   c) means responsive to said pressure test initiation signal, for sampling said electrical contacts of said pressure switch and producing a pass/fail report depending upon the presence or absence of an output signal.

3. An apparatus as in claim 2 in which said flow detector comprises a liquid flow meter having an electrical output corresponding to a rate of instantaneous liquid flow through said meter.

4. An apparatus as in claim 3 in which said liquid flow meter is within said housing.

5. An apparatus as in claim 3 in which said liquid flow meter further provides an electrical output corresponding to a cumulative amount of liquid which has flowed through said meter over a predetermined time.

6. An apparatus as in claim 5 in which said liquid flow meter is located within said housing.

7. An apparatus as in claim 2 in which said flow detector includes a liquid flow switch.

8. An apparatus as in claim 2 in which a plurality of said pass/fail reports is produced at predetermined intervals, and further including communication means for transmitting each of said pass/fail reports to a location remote from the housing.

9. An apparatus as in claim 2 including means to store said pass/fail report, and further including communications means responsive to said storage means for transmitting said pass/fail report to a location remote from the housing.

10. An apparatus as in claim 8 or 9 in which said communications means includes a telephone line between said storage means and said remote location.

11. An apparatus as in claim 8 or 9 in which said communications means is wireless, and includes a transmitter at said housing and a receiver at said remote location.

12. An apparatus for testing a check valve transversely positioned within a housing, the valve defining an upstream chamber and a downstream chamber therein, said apparatus comprising:
   a) a flow detector, producing a test initiation signal when at least substantial absence of liquid flowing through the housing is confirmed;
   b) a first pressure transducer in communication with the upstream chamber, said first transducer producing a first electrical output signal;
   c) a second pressure transducer in communication with the downstream chamber, said second transducer producing a second electrical output signal;
   d) means responsive to said test initiation signal, for subtracting said first electrical signal from said second electrical output signals, and outputting any difference between said signals;
   e) comparator means, for determining whether said difference outputted from said subtracting means meets a predetermined standard.

13. An apparatus as in claim 12 in which said comparator means further produces a pass/fail report based upon its determination, and in which said apparatus further includes communication means to transmit said pass/fail report to a location remote from the housing.

14. An apparatus for testing a check valve transversely positioned within a housing, the valve defining an upstream chamber and a downstream chamber therein, said apparatus comprising:
   a) a flow detector, producing a test initiation signal when at least substantial absence of liquid flowing through the housing is confirmed;
   b) a differential pressure transducer having one port in communication with the upstream chamber and another port in communication with the downstream chamber, said transducer producing an electrical output signal corresponding to any differential in pressures between the upstream and downstream chambers;
   c) comparator means, for determining whether said electrical output from said pressure transducer meets a predetermined standard, and producing a pass/fail report based upon that determination.

15. An apparatus as in claim 14 further including storage means for saving said pass/fail report for later retrieval.

16. An apparatus as in claim 14 further including communication means for transmitting said pass/fail report to a location remote from the housing.

17. An apparatus as in claim 14 further including means responsive to said comparator means, for visually displaying said pass/fail report.

18. An apparatus as in claim 17 in which said means for visually displaying is adjacent the housing.

19. An apparatus as in claim 17 including communication means for transmitting said pass/fail report to a location remote from said housing, and in which said means for visually displaying is positioned at said location.

20. An apparatus for testing a combined water flow meter and backflow preventer in which the backflow preventer includes a housing having an upstream check valve and a downstream check valve transversely positioned therein, the upstream check valve defining an upstream chamber and an intermediate chamber therein, and the downstream check valve further defining a downstream chamber therein, said apparatus comprising:
   a) means responsive to the water flow meter for producing a test initiation signal when at least substantial absence of liquid flowing through the housing is confirmed;

b) a first pressure transducer in communication with the upstream chamber, said first transducer producing a first electrical output signal;

c) a second pressure transducer in communication with the intermediate chamber, said second transducer producing a second electrical output signal;

d) a third pressure transducer in communication with the downstream chamber, said third transducer producing a third electrical output signal;

e) means responsive to said test initiation signal, for subtracting said second electrical output signal from said first electrical output signal, and said third electrical output signal from said second electrical output signal, and outputting any respective differences between said signals;

f) comparator means, for determining whether said outputs from said subtracting means meets a predetermined standard.

21. An apparatus for testing a combined water flow meter and backflow preventer in which the backflow preventer includes a housing having an upstream check valve and a downstream check valve transversely positioned therein, the upstream check valve defining an upstream chamber and an intermediate chamber therein, and the downstream check valve further defining a downstream chamber therein, said apparatus comprising:

a) means responsive to the water flow meter for producing a test initiation signal when at least substantial absence of liquid flowing through the housing is confirmed;

b) a first differential pressure transducer having port in communication with the upstream chamber and another port in communication with the intermediate chamber, said transducer producing a first electrical output signal having an amplitude corresponding to any differential in pressure between the upstream and intermediate chambers;

c) a second differential pressure transducer having one port in communication with the intermediate chamber and another port in communication with the downstream chamber, said transducer producing a second electrical output signal having an amplitude corresponding to any differential in pressure between the intermediate and downstream chambers;

d) first comparator means responsive to the test initiation signal, for determining whether the amplitude of said first electrical output signal meets a first predetermined standard;

e) second comparator means responsive to the test initiation signal, for determining whether the amplitude of said second electrical output signal meets a second predetermined standard.

22. An apparatus for testing a check valve transversely positioned within a housing, the valve defining an upstream chamber and a downstream chamber therein, said apparatus comprising:

a) a flow detector, producing a test initiation signal when at least substantial absence of liquid flowing through the housing is confirmed;

b) a first pressure sensor in communication with the upstream chamber, said first transducer producing a first electrical output signal;

c) a second pressure sensor in communication with the downstream chamber, said second transducer producing a second electrical output signal;

d) means responsive to said test initiation signal for sampling said first and second electrical output signals, and producing a pass/fail report dependent upon a comparison of said signals with a predetermined standard.

23. An apparatus for testing a backflow preventer in which the backflow preventer includes a housing having an upstream check valve and a downstream check valve transversely positioned therein, the upstream check valve defining an upstream chamber and an intermediate chamber therein, and the downstream check valve further defining a downstream chamber therein, said apparatus comprising:

a) a water flow switch or meter in communication with liquid flowing through the housing, said switch producing an output in response to the flow of water;

b) a first differential pressure switch having one port in communication with the upstream chamber and another port in communication with the intermediate chamber, said switch producing a first electrical output signal providing a first predetermined pressure differential exists between the upstream and intermediate chambers;

c) a second differential pressure switch having one port in communication with the intermediate chamber and another port in communication with the downstream chamber, said switch producing a second electrical output signal providing a second pressure differential exists between the intermediate and downstream chambers;

d) means responsive to the output from said water flow meter or switch, and producing a test initiation signal when the water flow is substantially zero; and, e) means responsive to said test initiation signal, for sampling said first and second electrical output signals, and producing a pass/fail report in response thereto.

24. An apparatus for testing a backflow preventer in which the backflow preventer includes a housing having an upstream check valve and a downstream check valve transversely positioned therein, the upstream check valve defining an upstream chamber and an intermediate chamber therein, and the downstream check valve further defining a downstream chamber therein, said apparatus comprising:

a) a water flow detector in communication with liquid flowing through the housing, said detector producing an output in response to the flow of water;

b) a differential pressure sensor having one port in communication with the upstream chamber and another port in communication with the intermediate chamber, said sensor producing an electrical output signal providing a predetermined pressure differential exists between the upstream and intermediate chambers;

c) a pressure relief valve having a first inlet and a second inlet, said relief valve including an inlet line interconnecting said first inlet and said upstream chamber, said second inlet being in communication with said intermediate chamber, said relief valve further including a discharge port in communication with the atmosphere;

d) a by-pass test line interconnecting said upstream chamber and said intermediate chamber, said test line including an electrically actuated valve selectively operable from a first closed position in which said test line is obstructed, to a second open position in which pressure from said upstream chamber is introduced into said intermediate chamber;

e) means responsive to the output from said water flow detector, and producing a test initiation signal when the water flow is substantially zero;

f) means responsive to said test initiation signal, for sampling said electrical output signal and comparing it to a predetermined value, and producing a pressure relief valve pass/fail report in response thereto.

25. An apparatus as in claim 24 in which said by-pass line includes a flow restricter.

26. An apparatus as in claim 24 in which said electrically actuated valve is a two-way solenoid valve installed in said inlet line, said valve having a normal position in which liquid flow is prevented only through said by-pass line, and an open position in which liquid flows freely both through said by-pass line and said inlet line.

27. A method for testing a backflow preventer in which the backflow preventer includes a housing having an upstream check valve and a downstream check valve transversely positioned therein, the upstream check valve defining an upstream chamber and an intermediate chamber, and the downstream check valve further defining a downstream chamber therein, said method comprising the steps of:

a) sampling the interior of the housing and producing a test initiation signal when at least substantial absence of liquid flowing through the housing is confirmed;

b) sampling the liquid pressure within the upstream chamber, and producing a first electrical output signal in response thereto;

c) sampling the liquid pressure within the intermediate chamber, and producing a second electrical output signal in response thereto;

d) sampling the liquid pressure within the downstream chamber, and producing a third electrical output signal in response thereto;

e) determining whether said first and second electrical output signals and said second and third electrical output signals, bear a predetermined relationship, to at least one predetermined standard;

f) producing a pass/fail report for at least one of said valves, based upon the determinations of step e.

28. A method for testing a check valve transversely positioned within a housing, the valve defining an upstream chamber and a downstream chamber therein, said method comprising the steps of:

a) producing a test initiation signal when at least substantial absence of liquid flowing through the housing is confirmed;

b) sampling the liquid pressure within the upstream chamber, in response to the test initiation signal;

c) sampling the liquid pressure within the downstream chamber, in response to the test initiation signal;

d) producing a pass report or a fail report, depending on whether or not a pressure differential exists between said samples of said upstream and downstream chambers, which differential meets a predetermined standard.

* * * * *